US010664869B2

(12) United States Patent
Mendiola et al.

(10) Patent No.: US 10,664,869 B2
(45) Date of Patent: May 26, 2020

(54) SYSTEMS AND METHODS FOR PROVIDING LOCATION-BASED DATA ANALYTICS APPLICATIONS

(71) Applicant: Facebook, Inc., Menlo Park, CA (US)

(72) Inventors: John Taskin Mendiola, Fair Oaks, CA (US); Edward Francis Wolf, San Francisco, CA (US); Mario Alberto Vinasco Vallejo, Fremont, CA (US); Joseph Messiha, Lincoln, CA (US)

(73) Assignee: Facebook, Inc., Menlo Park, CA (US)

( * ) Notice: Subject to any disclaimer, the term of this patent is extended or adjusted under 35 U.S.C. 154(b) by 327 days.

(21) Appl. No.: 15/070,743

(22) Filed: Mar. 15, 2016

(65) Prior Publication Data
US 2017/0270564 A1    Sep. 21, 2017

(51) Int. Cl.
| | | |
|---|---|---|
| *G06Q 30/00* | (2012.01) | |
| *G06Q 30/02* | (2012.01) | |
| *H04L 29/08* | (2006.01) | |
| *G06Q 50/00* | (2012.01) | |
| *G08G 1/01* | (2006.01) | |
| *G06Q 50/30* | (2012.01) | |
| *G08G 1/127* | (2006.01) | |

(52) U.S. Cl.
CPC ..... *G06Q 30/0261* (2013.01); *G06Q 30/0269* (2013.01); *G06Q 50/01* (2013.01); *G06Q 50/30* (2013.01); *G08G 1/012* (2013.01); *G08G 1/0129* (2013.01); *G08G 1/127* (2013.01); *H04L 67/18* (2013.01); *H04L 67/22* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 8,028,905 B2 * | 10/2011 | Holberg | ................. | G06Q 30/02 235/383 |
| 8,073,460 B1 * | 12/2011 | Scofield | .................. | H04W 4/21 455/456.1 |
| 2012/0084248 A1 * | 4/2012 | Gavrilescu | ........ | G06F 17/30867 706/52 |

(Continued)

FOREIGN PATENT DOCUMENTS

| | | | | | |
|---|---|---|---|---|---|
| JP | 2009217542 A | * | 9/2009 | ............. | G06Q 10/00 |
| JP | 2014162457 A | * | 9/2014 | ............... | B61L 25/02 |
| WO | WO-9823048 A1 | * | 5/1998 | ......... | H04B 10/1141 |

OTHER PUBLICATIONS

Iowa Dot. Iowa Commuter Transportation Study. (Dec. 15, 2014). Retrieved online Jan. 14, 2020. https://www.iowadot.gov/commuterstudy/pdfs/ITC_ReportWithAppendices.pdf (Year: 2014).*

(Continued)

*Primary Examiner* — James A Reagan
(74) *Attorney, Agent, or Firm* — Sheppard Mullin Richter & Hampton LLP

(57) ABSTRACT

Systems, methods, and non-transitory computer-readable media can receive user social network information, including user location information, for a plurality of users. The plurality of users is filtered based on user social network information. A business action is determined based on the user social network information.

19 Claims, 8 Drawing Sheets

(56) References Cited

U.S. PATENT DOCUMENTS

| | | | |
|---|---|---|---|
| 2012/0130817 A1* | 5/2012 | Bousaleh | G06Q 30/02 |
| | | | 705/14.58 |
| 2013/0046632 A1* | 2/2013 | Grigg | G06Q 30/02 |
| | | | 705/14.58 |
| 2013/0080911 A1* | 3/2013 | Klemm | G06F 17/3089 |
| | | | 715/745 |
| 2013/0124263 A1* | 5/2013 | Amaro | G06Q 30/02 |
| | | | 705/7.34 |
| 2015/0019328 A1* | 1/2015 | Abhyanker | G06Q 10/10 |
| | | | 705/14.45 |
| 2017/0109764 A1* | 4/2017 | Tripathi | G06Q 30/0202 |
| 2017/0132540 A1* | 5/2017 | Haparnas | G06Q 10/06311 |

OTHER PUBLICATIONS

Deitrick, Sabina. Impacts of Vanpooling in Pennsylvania and Future Opportunities. (Dec. 30, 2010). Retrieved online Jan. 14, 2020. https://ucsur.pitt.edu/files/center/Impacts_of_Vanpooling_2010.pdf (Year: 2010).*

Long et al. The Future of Transit in West Virginia. (Dec. 2013). Retrieved online Jan. 14, 2020. http://uknowledge.uky.edu/cgi/viewcontent.cgi?article=1000&context=ktc_externalreports (Year: 2013).*

* cited by examiner

SYSTEMS AND METHODS FOR PROVIDING LOCATION-BASED DATA ANALYTICS APPLICATIONS

FIELD OF THE INVENTION

The present technology relates to the field of social networks. More particularly, the present technology relates to providing location-based data analytics.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

As users utilize and interact on a social networking system, the social networking system can collect information that can be utilized by the social networking systems or third parties to improve products and services offered to users. For example, the social networking system can collect demographic information, social network interaction information, user location information, etc. Information collected by the social networking system can be used by the social networking system to improve services and products offered to users by learning more about user tendencies and preferences. In certain instances, collected information can be provided to third parties seeking to utilize such information to improve products and services based on insights that can be drawn from the collected information.

SUMMARY

Various embodiments of the present disclosure can include systems, methods, and non-transitory computer readable media configured to receive user social network information, including user location information, for a plurality of users. The plurality of users is filtered based on user social network information. A business action is determined based on the user social network information.

In an embodiment, user travel patterns are determined based on the user social network information.

In an embodiment, a predicted user travel course is predicted based on the user travel patterns.

In an embodiment, determining a business action based on the user social network information comprises providing an advertisement based on the predicted user travel course.

In an embodiment, filtering the plurality of users based on user social network information comprises filtering the plurality of users based on demographic information.

In an embodiment, filtering the plurality of users based on user social network information comprises filtering the plurality of users based on user residence information.

In an embodiment, the business action comprises opening a new location.

In an embodiment, the business action comprises implementing an employer-provided shuttle system.

In an embodiment, the business action comprises revising an employer-provided shuttle system based on the user social network information.

In an embodiment, revising the employer-provided shuttle system comprises revising at least one shuttle stop or at least one shuttle route based on the user social network information.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
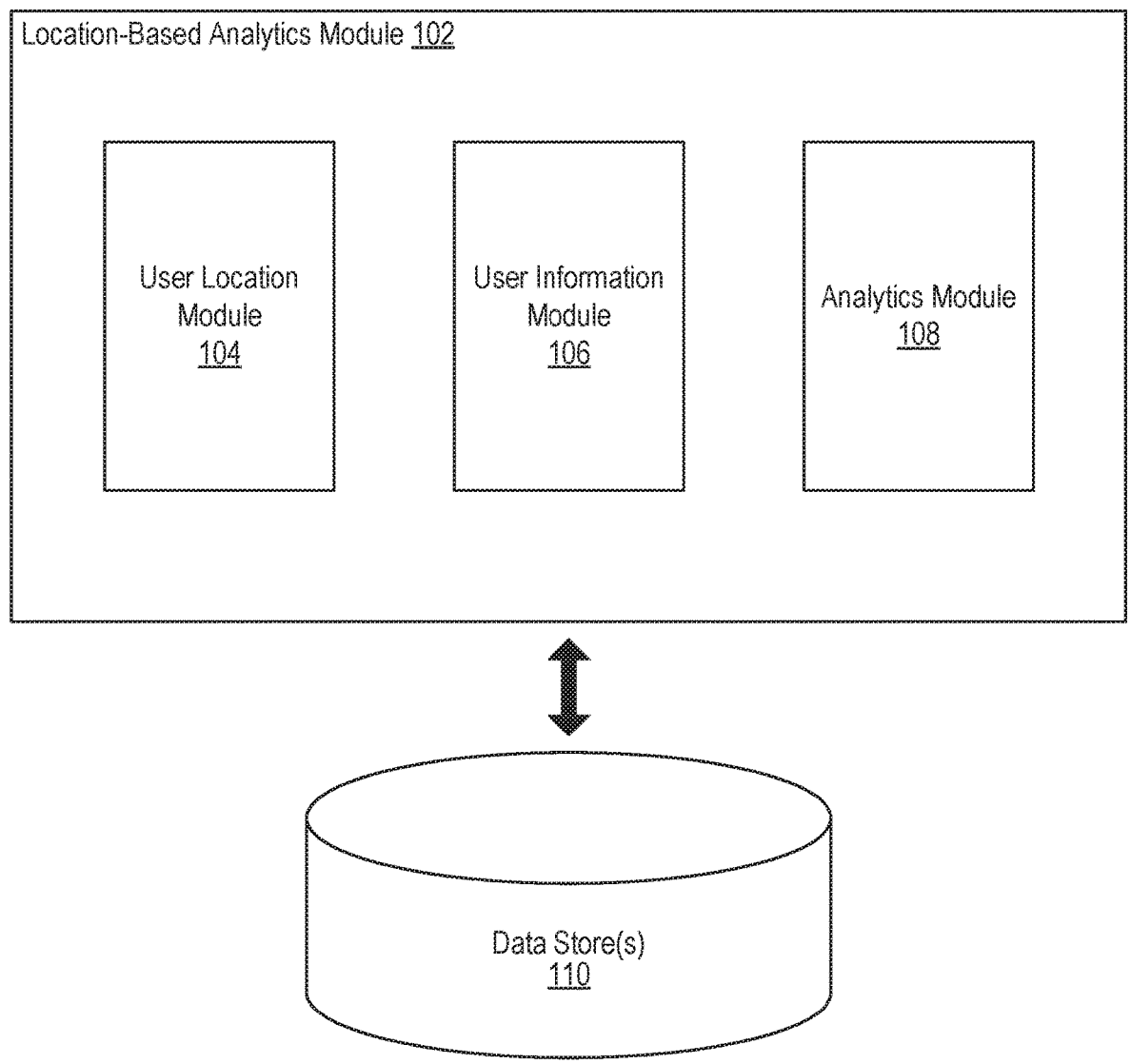
FIG. 1 illustrates an example system including a location-based analytics module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Social Network Location-Based Data Analytics

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system.

As users utilize and interact on a social networking system, the social networking system can collect information that can be used by the social networking systems or third parties to improve products and services offered to users. For example, the social networking system can collect demographic information, social network interaction information, user location information, etc. Information collected by the social networking system can be used by the social networking system to improve services and products offered to users by learning more about user tendencies and preferences. In certain instances, collected information can be provided to third parties seeking to utilize such information to improve products and services based on insights that can be drawn from the collected information.

It continues to be an important interest for a social networking system to utilize available information to draw useful insights about its users. Information and insights about users can be utilized by the social networking system and/or third parties to improve products and services offered to users. However, it can be difficult to organize and utilize the vast amounts of available information in an efficient and effective way. It can be particularly difficult to determine what information is relevant in making determinations about users and how to apply relevant information to draw accurate conclusions.

An improved approach rooted in computer technology overcomes the foregoing and other disadvantages associated with conventional approaches specifically arising in the realm of computer technology. Based on computer technology, the disclosed technology can utilize user location information and user social network information from a social networking system to improve systems and services offered to a user. In certain embodiments, user location information and user information are used to improve transportation systems. For example, user location information and user information can be used to determine: user residence information, which users utilize one or more transportation systems, average commute times for users, average distance from stops on the transportation systems, and so forth. This information can be used to optimize placement of stops for one or more transportation systems, and routes for one or more transportation systems, so as to minimize average commute times, and to maximize efficiency of resources. In certain embodiments, user location information and user information are used to improve other systems, such as city planning and business operations. For example, user commute information can help determine where to build new residences or new businesses, and to provide targeted advertisements to customers.

FIG. 1 illustrates an example system 100 including an example location-based analytics module 102 configured to collect and analyze location-based information, according to an embodiment of the present disclosure. The location-based analytics module 102 can be configured to utilize user location information along with user social network information to improve systems and services offered to users. In certain embodiments, user location information can be provided by a user's mobile device in conjunction with other location detection devices. User social network information can include demographic information such as age and gender, residential location information, social graph information, and any other information that can be provided by the social networking system. In various embodiments, user location information and user social network information can be utilized to improve transportation systems. For example, stops on the transportation system and/or routes on the transportation system can be added, removed, revised, or moved, based on user location information and user social network information. In various embodiments, user location information and user social network information can be utilized to improve other systems. For example, city planners, residential planners, and/or business planners can use available information to determine the best location for various facilities or services. In another example, business planners can contact various users or provide user-specific advertisements based on user location information and user social network information.

As shown in the example of FIG. 1, the location-based analytics module 102 can include a user location module 104, a user information module 106, and an analytics module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The user location module 104 can be configured to determine a user's location and store user location information. The user location module 104 can be configured to receive user location information from a variety of sources. For example, a user's location can be provided with precision within a few hundred meters based on GPS-capabilities in the user's mobile device. A user's location can also be provided as a user moves into and out of various buildings, buses, trains, or other facilities. For example, low power Bluetooth beacons can be placed in a room, a bus, or a train, to detect a user's presence in the room, bus, or train within a few meters' accuracy. Alternatively, or in addition, a user's presence in a particular area (e.g., building, room, bus, train, etc.) can be detected using traditional badging systems, in which users access facilities or buildings by scanning an identification badge associated with the user to enter the facility. It should be clear that many variations are possible, and any device or system indicating a user's location can be used. The user location module 104 can aggregate user location information based on various sources to keep track of a user's location throughout the day, storing and analyzing a user's movement throughout the day. For example, for a particular user, the user location module 104 can determine that the user hopped onto a bus at 7:40 AM at a first location, and then entered a building at 9:00 AM at a second location (e.g., the user's place of employment). Using Bluetooth beacons positioned throughout the building, or other location detection technology, the user's movement within the building from room to room can also be determined. At 6:45 PM, the user location module 104 can receive notification that the user exited the building, and entered a taxi or driver service at 6:55 PM (e.g., by noting that the user made a payment with the taxi or driver service using the user's mobile device). The user's drop-off destination can then be noted. User location information, both past and present, can be used by other module disclosed herein to recognize patterns and trends, and to make inferences about likely future user behavior, so as to improve systems and services offered to users.

The user information module 106 can be configured to collect and store additional user information apart from the user location information described above. For example, additional user information can include user social network information that is collected based on a user's activities on a social networking system. For example, user social network information can include user demographic information (e.g., gender and age), social graph information, merchants that the user frequents (e.g., via check-ins) or is a fan of (e.g., the user has liked a merchant's page on the social networking system), the user's residential information, the user's place of employment, and any other information available to the social networking system. In various embodiments, additional user information collected and stored by the user information module 106 can include third party user information provided by a party other than the social networking system. For example, third party user information can be provided by a third party that seeks to utilize information available to the social networking system to improve systems and services offered to users. This can include, for example, transportation planners or companies (e.g., CalTrain, BART, Amtrak, etc.) seeking to improve the efficiency of routes or stops, employers seeking to provide transportation services for its employees or simply to learn more about employees' commutes or travel habits. Third party user information, i.e., user information provided by a third party, can be joined with user social network information to create a fuller user profile that can be used to analyze user travel patterns. For example, certain information may be available to a social networking system that is not available to a user's employer (e.g., user social graph information, user location information collected by the social networking system), and certain information may be available to the user's employer that is not available to the social networking system (e.g., a user's compensation or position at the company). By combining information available to the third party and to the social networking system, travel information can be sorted, filtered, and/or analyzed in additional useful ways to determine travel patterns and habits of various groups of users. user information module 106 is discussed in greater detail herein.

The analytics module 108 can be configured to analyze user information and user location information to optimize systems and services offered to users. In various embodiments, transportation systems can be modified or designed based on user information and user location information. For example, an employer looking to provide shuttle services for its employees can utilize user residential information and travel patterns to optimize shuttle stops and routes. The employer can determine which employees utilize the shuttle system and where those users live to determine where to place shuttle stops such that at least a minimum percentage of users live within a threshold distance of a shuttle stop, e.g., 80% of users live within one mile of a shuttle stop. The employer can also utilize user location information for each employee to make numerous useful determinations to create commuter metrics, e.g., how many employees are on a shuttle at a given time, average commute time for each user on a day-to-day basis, etc. Routes can be determined so as to minimum user commute time, and various thresholds can be implemented, e.g., 90% of riders having a commute time of less than 85 minutes.

In addition to planning transportation systems, various other systems and services can be improved using the user information and user location information. In various embodiments, city planners can utilize available information to plan the location and availability of various facilities or to make zoning decisions. In various embodiments, businesses can utilize available information to make business decisions, such as where to place a new business, or optimal business hours. In certain embodiments, businesses can also target users with advertisements based on the user's location information and travel patterns. For example, if a user takes a bus to work along the same route every day, and a particular merchant has a location along the bus route, the merchant can provide an advertisement or coupon to the user to try to get the user to stop in during his or her ride to or from work. The analytics module 108 is discussed in greater detail herein.

The location-based analytics module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the location-based analytics module 102 can be implemented, in part or in whole, as software running on one or more computing devices or systems, such as on a server computing system or a user (or client) computing system. For example, the location-based analytics module 102 or at least a portion thereof can be implemented as or within an application (e.g., app), a program, or an applet, etc., running on a user computing device or a client computing system, such as the user device 710 of FIG. 7. In another example, the location-based analytics module 102 or at least a portion thereof can be implemented using one or more computing devices or systems that include one or more servers, such as network servers or cloud servers. In some instances, the location-based analytics module 102 can, in part or in whole, be implemented within or configured to operate in conjunction with a social networking system (or service), such as the social networking system 730 of FIG. 7. It should be understood that there can be many variations or other possibilities.

The location-based analytics module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 730 of FIG. 7). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the location-based analytics module 102. For example, the data store 110 can store user location information, user travel patterns based on the user location information, third party user information, and the like. It is contemplated that there can be many variations or other possibilities.

Figure 2:
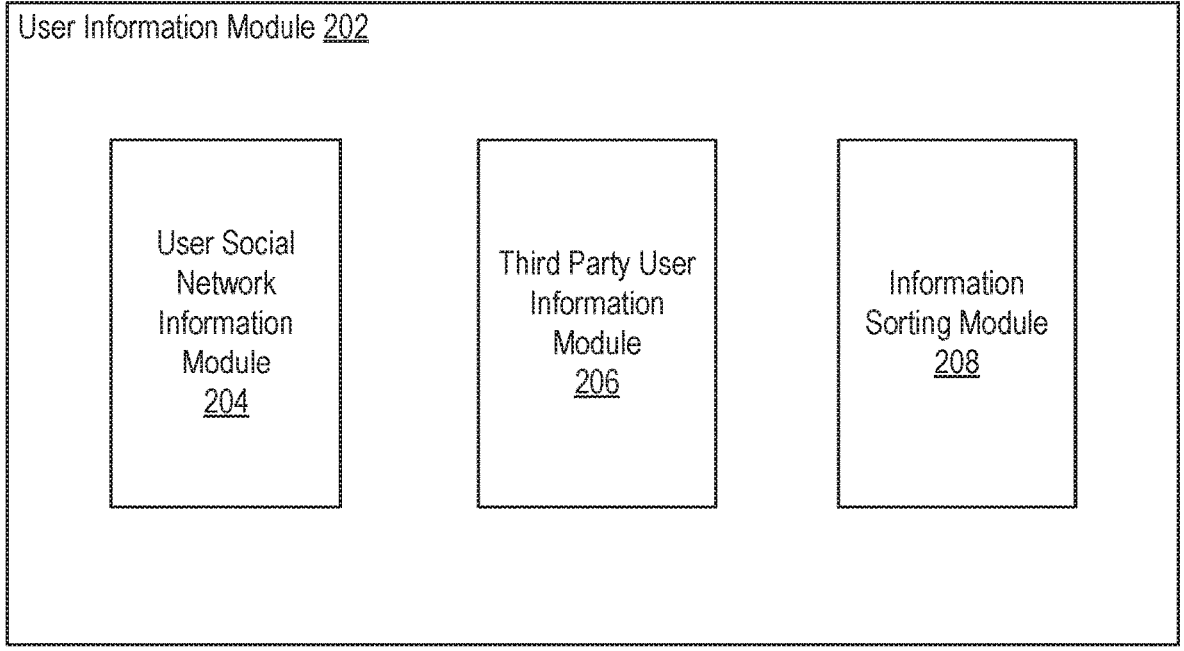
FIG. 2 illustrates an example user information module, according to an embodiment of the present disclosure.

FIG. 2 illustrates an example user information module 202 configured to collect and store user information, according to an embodiment of the present disclosure. In some embodiments, the user information module 106 of FIG. 1 can be implemented as the example user information module 202. As shown in FIG. 2, the user information module 202 can include a user social network information module 204, a third party user information module 206, and an information sorting module 208.

The user social network information module 204 can be configured to collect information associated with a user's profile on a social networking system. A user's profile on a social networking system can be used to gain information about the user. For example, the user's demographic information, information about the user's preferred activities (e.g., via check-ins or posts on the social networking system), information about the user's social graph, and the like, can be pulled from the social networking system. In certain embodiments, user social network information can be used in conjunction with user location information. In various embodiments, user social network information can include user location information. In a more specific embodiment, a social networking system can be configured to detect a user's location based on an application installed on the user's mobile device. For example, low power Bluetooth beacons can be configured to communicate with a social networking system application running in the background of a user's mobile device to detect the user's location proximate a Bluetooth beacon. As discussed above, a Bluetooth beacon located in a particular building or particular room or hallway can identify the user as being located in that building, room, or hallway, or a Bluetooth beacon located on a bus or train can indicate the user's location on the bus or train. Payment systems can be implemented on the social networking system so that a user can pay for services using the social networking system. Payment for services can be indicative of the user's location. For example, a social networking system mobile application installed on a user's mobile device can be used to pay for cab fare, or a bus far, or a train ticket, which can then indicate to the social networking system that the user entered a cab, bus, or train at a particular location at a particular time. The payment system can be configured to provide payment across a variety of different transportation platforms and providers, e.g., can be used for payment on any subway provider, train provider, bus provider, taxi provider, limo provider, etc. In this way, a user can use the social networking system mobile application to gain entry to multiple transportation providers in various regions or countries, and the user's location can be determined no matter the provider of the transportation service.

The third party user information module 206 can be configured to collect information associated with a user based on third party information. For example, information available to municipalities, service providers, employers, or any other third party can be combined with available user social network information to group users into similar groups and glean helpful information about users' travel patterns and habits. For example, an employer can use information available to the employer, as well as user location information (possibly provided by a social networking system) to determine which of its employees use an employer-provided shuttle system. Users can be divided into various groups based on usage of the employer-provided shuttle system, e.g., frequent user, sporadic user, non-user. The employer can make decisions based on users' travel patterns. For example, shuttle stops can be added or removed or rearranged so as to increase the number of frequent users located near shuttle stops, and shuttle routes can be added or removed or rearranged so as to minimize commute times for frequent users.

The information sorting module 208 can be configured to sort user social network information and/or third party user information. For example, in the example of the employer-provided shuttle service, the employer may have a greater interest in providing free shuttle services for low-income employees. Employee salary information is third party user information that is available to the employer. As such, the employer can filter the information to include only those employees making less than a threshold salary, or who work for hourly pay, and design shuttle stops and routes to maximize availability for low-income employees. In another example, an employer can utilize user social network information to determine that a large number of its employees will be attending, or regularly attend, a particular event, and arrange for shuttle service to the event for its employees based on routes and stops that stop near the homes of employees who plan to attend or regularly attend the event.

It should be appreciate that available information can be sorted and/or filtered based on limitless ways based on the interests and priorities of the party using the information.

Figure 3:
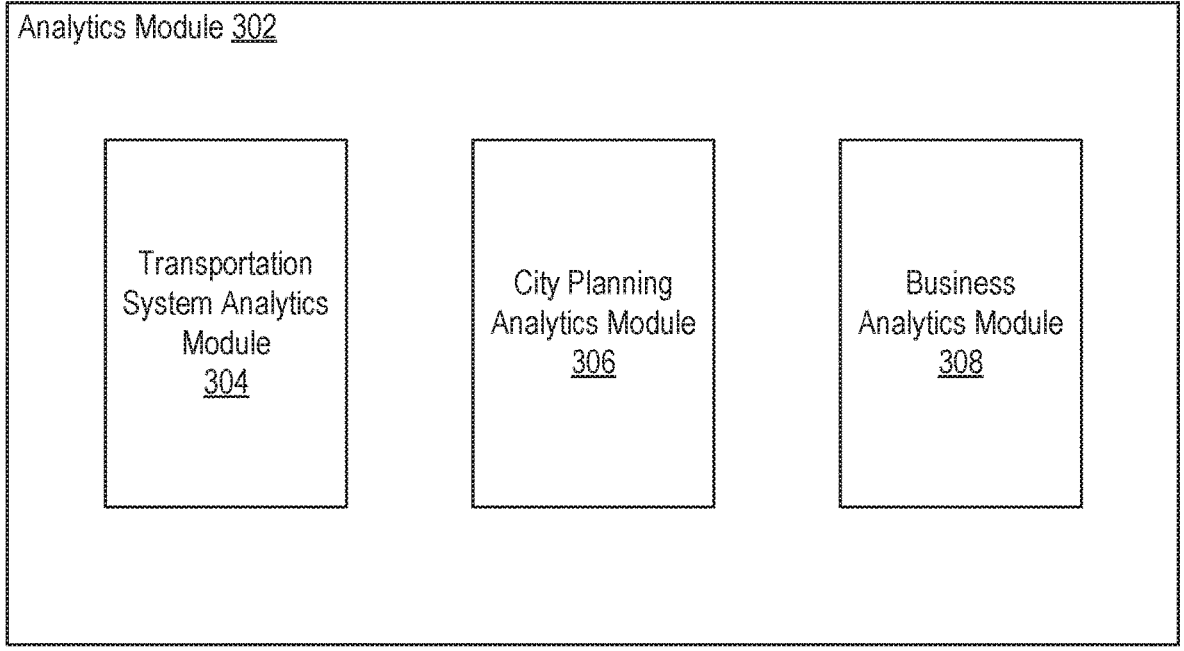
FIG. 3 illustrates an example analytics module, according to an embodiment of the present disclosure.

FIG. 3 illustrates an example analytics module 302 configured to analyze user information and user location information, according to an embodiment of the present disclosure. In some embodiments, the analytics module 108 of FIG. 1 can be implemented as the example analytics module 302. As shown in FIG. 3, the analytics module 302 can include a transportation system analytics module 304, a city planning analytics module 306, and a business analytics module 308.

The transportation system analytics module 304 can be configured to analyze available information to implement efficient transportation systems. In various embodiments, a transportation system can be created or revised based on a combination of user social network information, third party user information, and user location information. For example, user location information can be collected over a period of time to determine users that use a transportation system. In certain embodiments, users can be identified or distinguished based on user social network information. For example, a user can gain entry to the transportation system via a social networking system mobile application, or a user's transportation system profile (e.g., a user ID or account number) can be associated with a profile on a social networking system.

Transportation system resources can be allocated based on user location information. For example, transportation system stops can be positioned to maximize the number of users located near the stops, e.g., within a distance threshold. In a more particular example, stops may be positioned such that at least 80% of users are located within one mile of a stop. In certain embodiments, a set of users can be identified. This set of set of users can include all past users, or past users within a particular period of time (users who have used the transportation system within the past year), all potential users (e.g., all employees of an employer for an employer-provided transportation system, or all residents of a particular region), etc. In various embodiments, user location information can be used to group the set of users into groups based on usage of the transportation system, e.g., frequent users, sporadic users, or non-users. Such groupings can be useful in maximizing resources and determining how best to improve services. For example, transportation service stops can be selected for proximity to groupings of frequent users (e.g., so that 80% of frequent users are located within one mile of a stop), and sporadic or non-users can be contacted with surveys or questionnaires requesting information on how to get those users to use the transportation system more frequently.

In certain embodiments, user location information can be used to determine average user commute times, and to optimize transportation system routes so as to minimize average user commute times. For example, routes can be configured such that average user commute time for a percentage of users falls below an upper commute time limit. In a more particular example, transportation system routes can be configured such that for a given route, average user commute time for 80% of riders falls below 85 minutes.

In another example, user location information can be used to determine and track the average number of riders on a bus throughout various times of the day. Average ridership information can be used to determine peak and non-peak periods throughout each day. In this way, a transportation system provider can determine which routes, at which times, require larger buses, and which routes, at which times, can be serviced with smaller buses.

As information will be tagged including each user's location, time, and user-specific information, information can be tailored in different ways. Travel patterns can be gleaned for an average weekday, or for every day of the week (e.g., travel patterns on Tuesdays and Wednesdays, may be different from Fridays and Mondays), and for holidays-generally, or for specific holidays (e.g., travel patterns on Thanksgiving and Christmas), or for a particular time of year, etc. Transportation system stops, routes, and resources can be allocated differently based on the travel patterns determined based on user location information.

The city planning analytics module 306 can be configured to make city planning decisions based on user information and user location information. For example, city, county, or municipality planners can build or relocate facilities, or make zoning decisions, to better serve the community based on movement/travel patterns of their community. Residential planners can take advantage of data to provide housing and accommodations closer to where people are working and/or based on their commuting patterns.

The business analytics module 308 can be configured to make business planning decisions based on user information and user location information. Business planners can determine where people are clustered and peoples' movement patterns, to purchase existing real estate or build new buildings. Movement patterns can be filtered based on demographic information to target businesses' key demographics. Employers can provide transportation, or plan events, or plan new locations, based on their employees' movement patterns. Retail planners can target people more effectively by providing goods and services that reflect their communities' movements throughout the hour, day, week, and month. Advertisements can be targeted to users based on users' travel patterns. For example, a merchant can target users whose typical commuting routes take them past a location of the merchant.

Although the examples of transportation systems, city planning, and business analytics have been discussed herein, it should be recognized that the presently disclosed technology is not so limited, and can be applied to any area or field.

Figure 4:
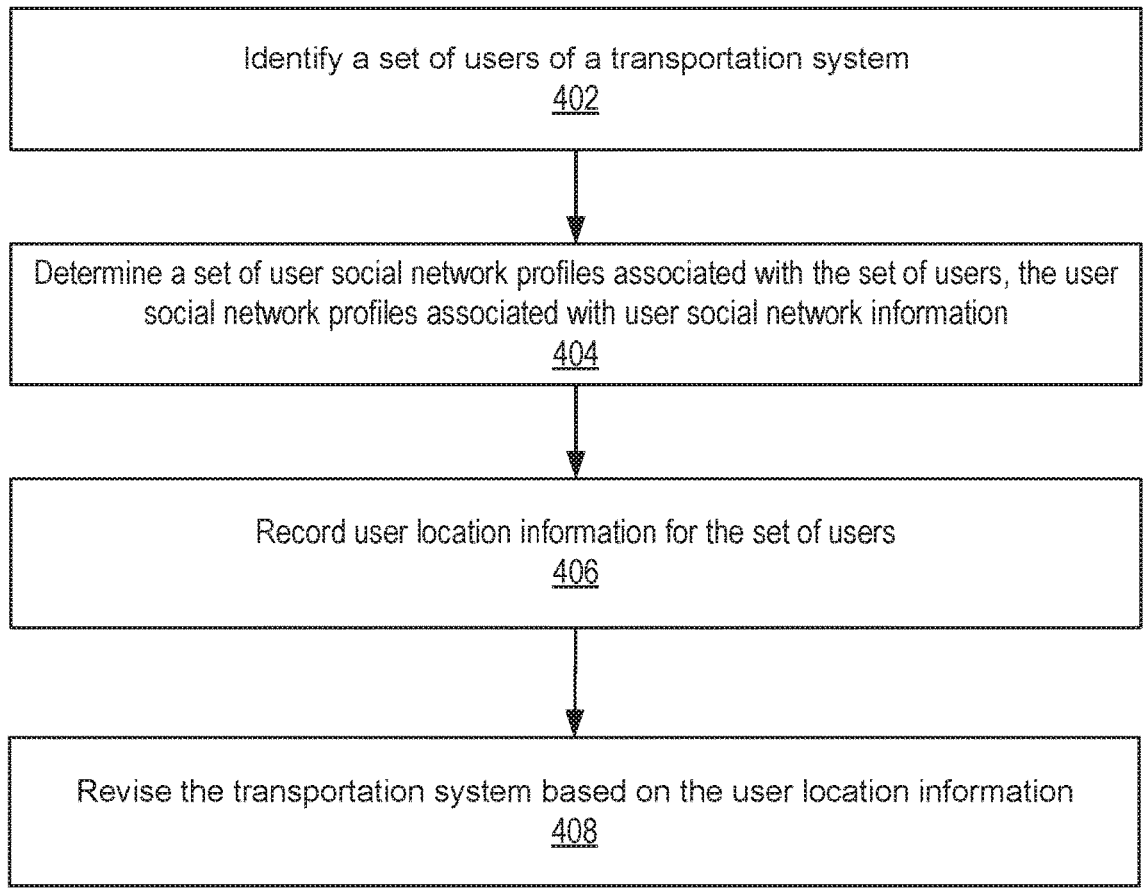
FIG. 4 illustrates an example method for revising a transportation system based on user location information, according to an embodiment of the present disclosure.

FIG. 4 illustrates an example method 400 associated with revising a transportation system based on user location information, according to an embodiment of the present disclosure. It should be appreciated that there can be additional, fewer, or alternative steps performed in similar or alternative orders, or in parallel, based on the various features and embodiments discussed herein unless otherwise stated.

At block 402, the example method 400 can identify a set of users of a transportation system. At block 404, the example method 400 can determine a set of user social network profiles associated with the set of users, the user social network profiles associated with user social network information. At block 406, the example method 400 can record user location information for the set of users. At block 408, the example method 400 can revise the transportation system based on the user location information. Other suitable techniques that incorporate various features and embodiments of the present technology are possible.

Figure 5:
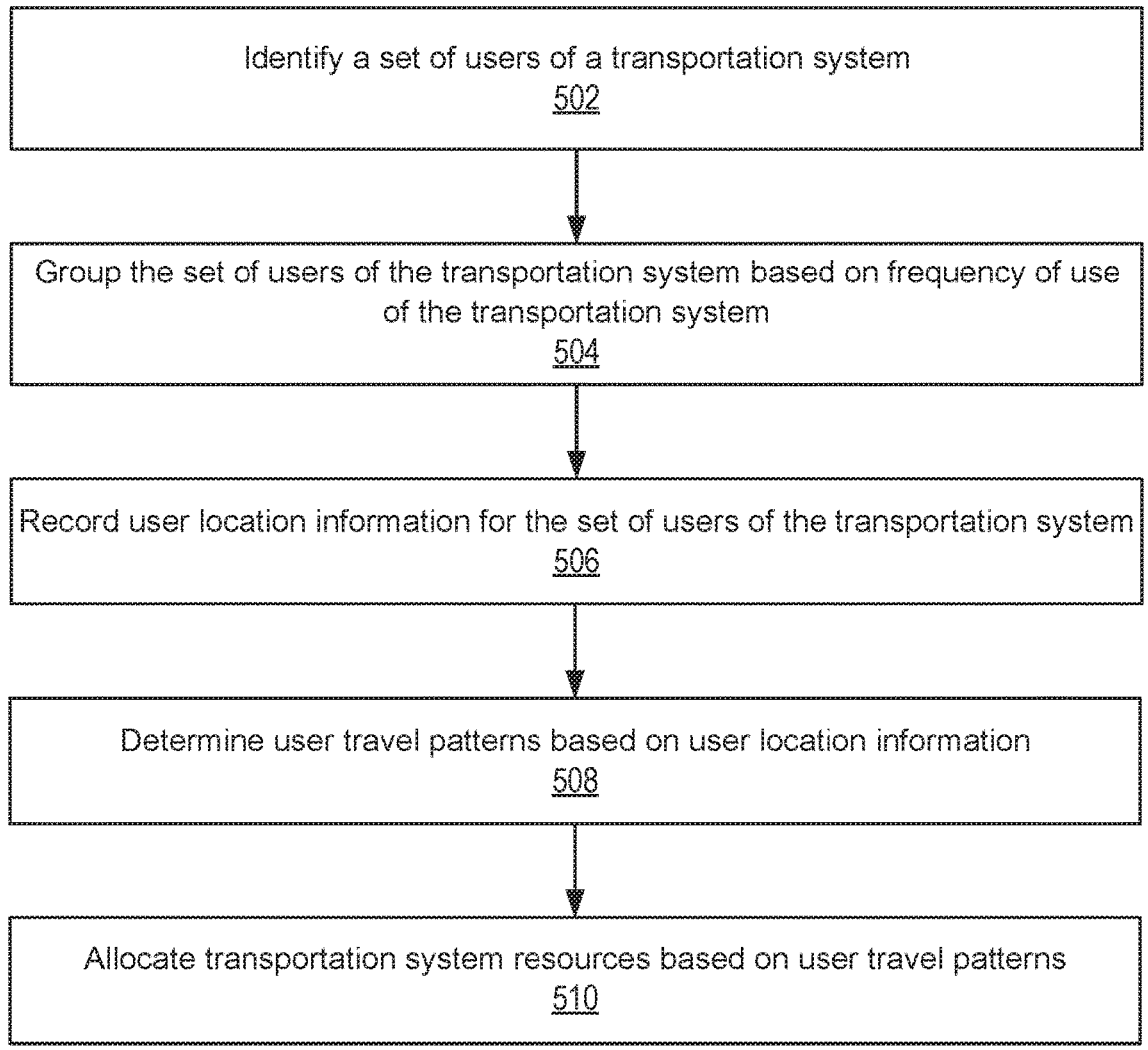
FIG. 5 illustrates an example method for allocating transportation system resources based on user travel patterns, according to an embodiment of the present disclosure.

FIG. 5 illustrates an example method 500 associated with allocating transportation system resources based on user travel patterns, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can identify a set of users of a transportation system. At block 504, the example method 500 can group the set of users of the transportation system based on frequency of use of the transportation system. At block 506, the example method 500 can record user location information for the set of users of the transportation system. At block 508, the example method 500 can determine user travel patterns based on the user location information. At block 510, the example method 500 can allocate transportation resources based on user travel patterns. Other suitable techniques that incorporate various features and embodiments of the present technology are possible.

Figure 6:
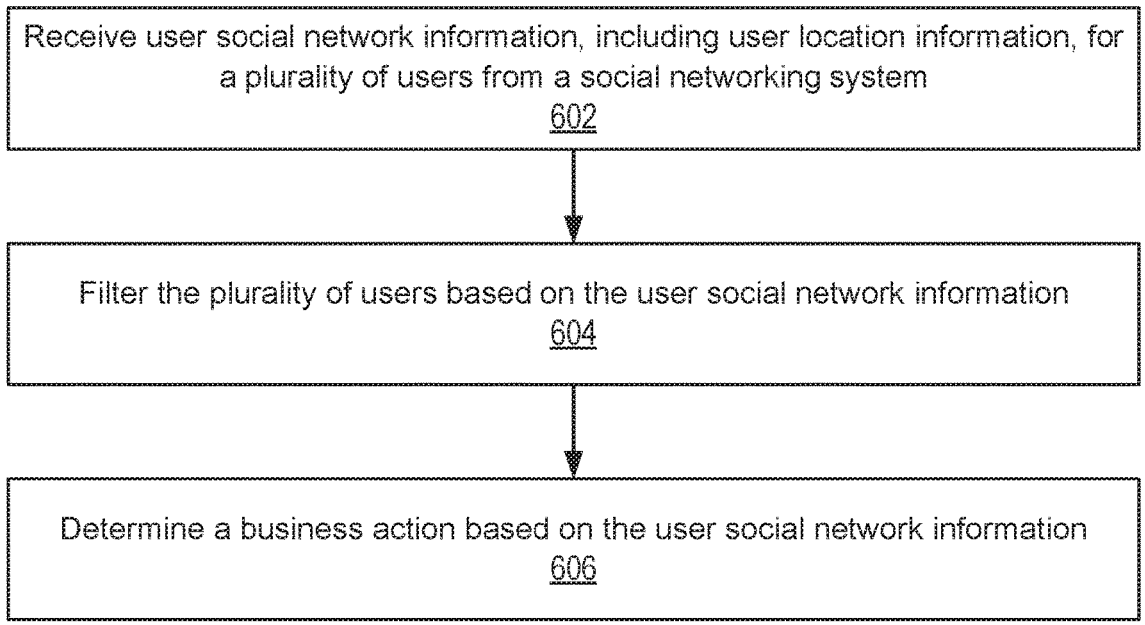
FIG. 6 illustrates an example method for making a business decision based on user location information, according to an embodiment of the present disclosure.

FIG. 6 illustrates an example method 600 associated with making a business decision based on user location information, according to an embodiment of the present disclosure. It should be appreciated that there can be additional, fewer, or alternative steps performed in similar or alternative orders, or in parallel, based on the various features and embodiments discussed herein unless otherwise stated.

At block 602, the example method 600 can receive user social network information, including user location information, for a plurality of users from a social networking system. At block 604, the example method 600 can filter a set of users based on the user social network information. At block 606, the example method 600 can determine a business action based on the user social network information. Other suitable techniques that incorporate various features and embodiments of the present technology are possible.

Social Networking System—Example Implementation

Figure 7:
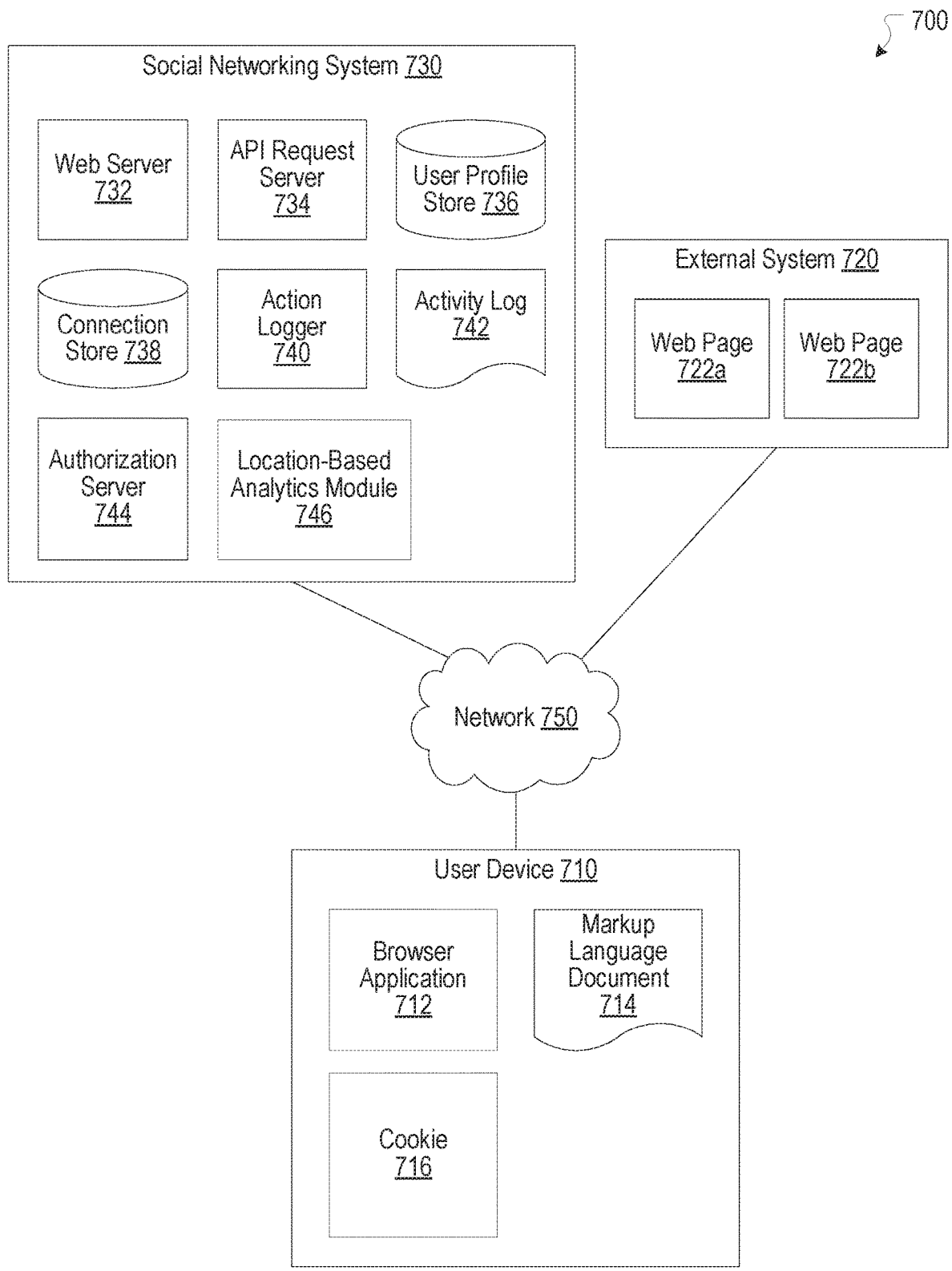
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user may be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This can occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a location-based analytics module 746. The location-based analytics module 746 can, for example, be implemented as the location-based analytics module 102 of FIG. 1. As discussed previously, it should be appreciated that there can be many variations or other possibilities. For example, in some instances, the location-based analytics module 746 (or at least a portion thereof) can be included or implemented in the user device 710. Other features of the location-based analytics module 746 are discussed herein in connection with the location-based analytics module 102.

Hardware Implementation

Figure 8:
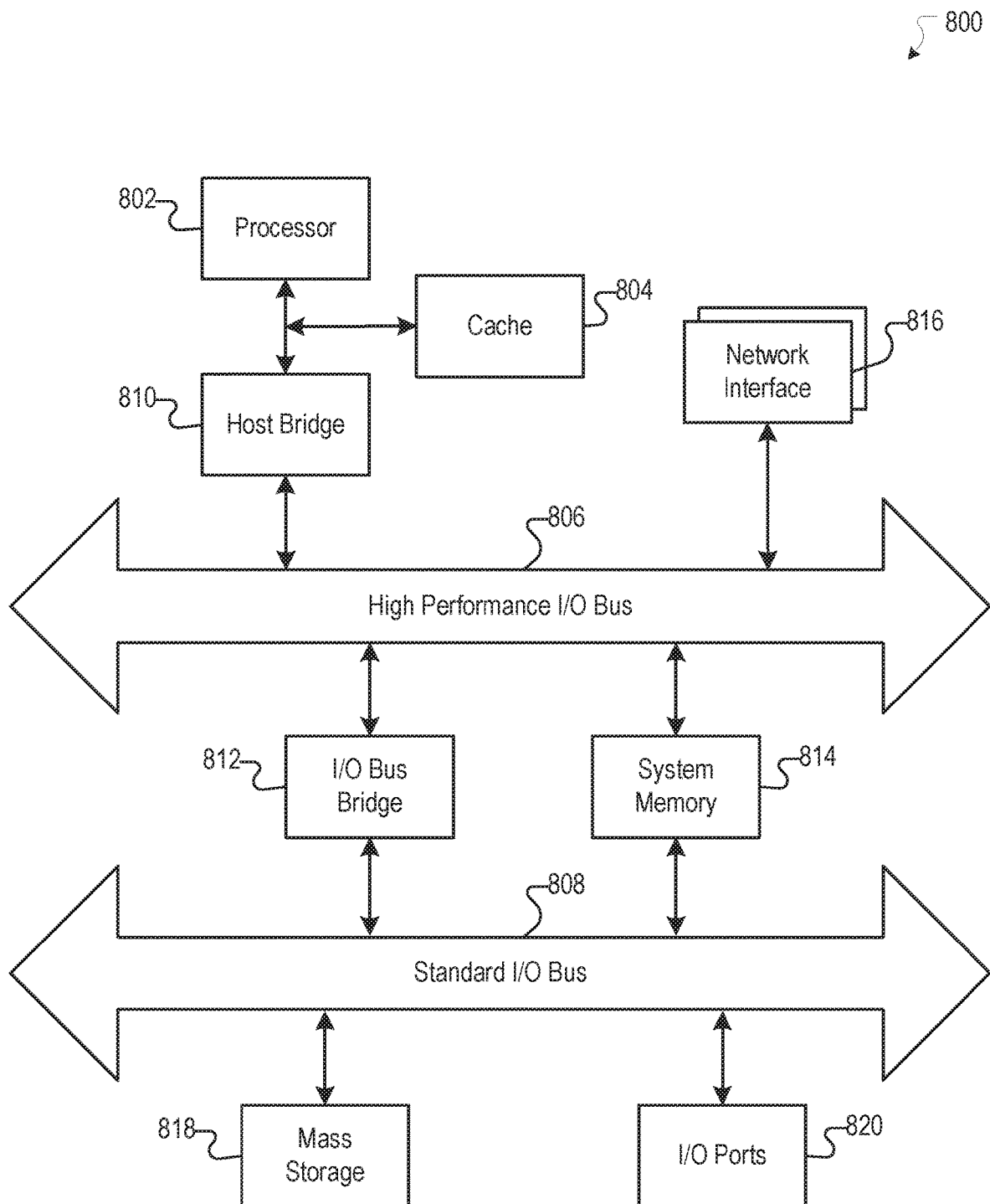
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, California, UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, user social network information, including user location information, for a plurality of users, wherein the user location information includes places of employment and usage frequencies of a transportation system;
filtering, by the computing system, the plurality of users based on the user social network information, wherein the filtering comprises identifying a first set of users that utilize the transportation system at a first frequency and are employees of a first place of employment and identifying a second set of users that utilize the transportation system at a second frequency and are employees of the first place of employment;
modifying, by the computing system, the transportation system based on user social network information associated with the first set of users, wherein
the modifying the transportation system based on user social network information associated with the first set of users comprises modifying the transportation system such that a threshold number of users of the first set of users reside within a threshold distance of the transportation system; and
requesting, by the computing system, information from the second set of users to increase the usage frequency associated with the second set of users.

2. The computer-implemented method of claim 1, further comprising determining user travel patterns based on the user social network information.

3. The computer-implemented method of claim 2, further comprising predicting a predicted user travel course based on the user travel patterns.

4. The computer-implemented method of claim 3, further comprising providing an advertisement based on the predicted user travel course.

5. The computer-implemented method of claim 1, wherein filtering the plurality of users based on the user social network information further comprises filtering the plurality of users based on demographic information.

6. The computer-implemented method of claim 1, wherein filtering the plurality of users based on the user social network information further comprises filtering the plurality of users based on user residence information.

7. The computer-implemented method of claim 1, wherein the modifying the transportation system further comprises modifying one or more routes of the transportation system.

8. The computer-implemented method of claim 1, wherein the modifying the transportation system further comprises modifying one or more stops of the transportation system.

9. The computer-implemented method of claim 8, wherein the modifying the transportation system further comprises modifying one or more stops of the transportation system such that a threshold number of users of the first set of users reside within a threshold distance of a stop of the transportation system.

10. A system comprising:
at least one processor; and
a memory storing instructions that, when executed by the at least one processor, cause the system to perform a method comprising:
receiving user social network information, including user location information, for a plurality of users, wherein the user location information includes places of employment and usage frequencies of a transportation system;
filtering the plurality of users based on the user social network information, wherein the filtering comprises identifying a first set of users that utilize the transportation system at a first frequency and are employees of a first place of employment and identifying a second set of users that utilize the transportation system at a second frequency and are employees of the first place of employment;
modifying the transportation system based on user social network information associated with the first set of users, wherein
the modifying the transportation system based on user social network information associated with the first set of users comprises modifying the transportation system such that a threshold number of users of the first set of users reside within a threshold distance of the transportation system; and
requesting information from the second set of users to increase the usage frequency associated with the second set of users.

11. The system of claim 10, wherein the method further comprises determining user travel patterns based on the user social network information.

12. The system of claim 11, wherein the method further comprises predicting a predicted user travel course based on the user travel patterns.

13. The system of claim 12, wherein the method further comprises providing an advertisement based on the predicted user travel course.

14. The system of claim 10, wherein filtering the plurality of users based on the user social network information further comprises filtering the plurality of users based on demographic information.

15. A non-transitory computer-readable storage medium including instructions that, when executed by at least one processor of a computing system, cause the computing system to perform a method comprising:
receiving user social network information, including user location information, for a plurality of users, wherein the user location information includes places of employment and usage frequencies of a transportation system;
filtering the plurality of users based on the user social network information, wherein the filtering comprises identifying a first set of users that utilize the transportation system at a first frequency and are employees of a first place of employment and identifying a second set of users that utilize the transportation system at a second frequency and are employees of the first place of employment;
modifying the transportation system based on user social network information associated with the first set of users, wherein
the modifying the transportation system based on user social network information associated with the first set of users comprises modifying the transportation system such that a threshold number of users of the first set of users reside within a threshold distance of the transportation system; and
requesting information from the second set of users to increase the usage frequency associated with the second set of users.

16. The non-transitory computer-readable storage medium of claim 15, wherein the method further comprises determining user travel patterns based on the user social network information.

17. The non-transitory computer-readable storage medium of claim 16, wherein the method further comprises predicting a predicted user travel course based on the user travel patterns.

18. The non-transitory computer-readable storage medium of claim 17, wherein the method further comprises providing an advertisement based on the predicted user travel course.

19. The non-transitory computer-readable storage medium of claim 15, wherein filtering the plurality of users based on the user social network information further comprises filtering the plurality of users based on demographic information.

* * * * *